US008009402B2

(12) United States Patent
Klaube

(10) Patent No.: US 8,009,402 B2
(45) Date of Patent: Aug. 30, 2011

(54) SURGE ARRESTER WITH A CAGE DESIGN, AND A PRODUCTION METHOD FOR IT

(75) Inventor: Hartmut Klaube, Hermdorf (DE)

(73) Assignee: Tridelta Uberspannungsableiter GmbH, Hermsdorf (DE)

( * ) Notice: Subject to any disclaimer, the term of this patent is extended or adjusted under 35 U.S.C. 154(b) by 407 days.

(21) Appl. No.: 12/162,060

(22) PCT Filed: Dec. 22, 2006

(86) PCT No.: PCT/EP2006/070196
§ 371 (c)(1),
(2), (4) Date: Oct. 16, 2008

(87) PCT Pub. No.: WO2007/085338
PCT Pub. Date: Aug. 2, 2007

(65) Prior Publication Data

US 2009/0046408 A1 Feb. 19, 2009

(30) Foreign Application Priority Data

Jan. 25, 2006 (DE) ......................... 10 2006 003 579

(51) Int. Cl.
*H02H 3/22* (2006.01)
*H02H 9/06* (2006.01)

(52) U.S. Cl. ......... 361/127; 361/134; 361/117; 361/121

(58) Field of Classification Search .................. 361/127, 361/134, 121, 117
See application file for complete search history.

(56) References Cited

U.S. PATENT DOCUMENTS

| | | | | |
|---|---|---|---|---|
| 5,444,429 | A * | 8/1995 | Sakich et al. | 338/21 |
| 5,517,382 | A | 5/1996 | Leupp et al. | |
| 6,396,676 | B1 * | 5/2002 | Doone et al. | 361/117 |
| 6,777,614 | B1 * | 8/2004 | Suenwoldt | 174/53 |

FOREIGN PATENT DOCUMENTS

| | | |
|---|---|---|
| DE | 199 40 939 | 7/2001 |
| EP | 0614 198 | 9/1994 |
| JP | 63 312602 | 12/1988 |

OTHER PUBLICATIONS

International Search Report in corresponding PCT/EP2006/070196 dated Mar. 21, 2007.
Written Opinion in corresponding PCT/EP2006/070196.
International Preliminary Report of Patentability in corresponding PCT/EP2006/070196 dated Oct. 14, 2008.

* cited by examiner

*Primary Examiner* — Rexford Barnie
*Assistant Examiner* — Zeev Kitov
(74) *Attorney, Agent, or Firm* — McCracken & Frank LLP

(57) ABSTRACT

The invention relates to a surge arrester having a cage design, and to a method for its production. According to the invention, during extrusion-coating or encapsulation of a module comprising two end fittings (3) and a plurality of varistor blocks (1) and at least one reinforcing element (9) in order to form the outer housing (5), first through-holes (11) for the reinforcing element (9) thereof are sealed with silicone. For this purpose, second through-holes (15) are provided in the end fittings (3), through which the silicone runs during casting or spraying, and enters the through-holes (11) from the outside, in order in this way to seal them against water and moisture.

7 Claims, 2 Drawing Sheets

SURGE ARRESTER WITH A CAGE DESIGN, AND A PRODUCTION METHOD FOR IT

The invention relates to a surge arrester having a cage design, as is known by way of example from JP 62-149511 (application number), and to a method for production of a surge arrester such as this.

Surge arresters are connected between live cables and earth in electrical power supply systems in order, in the event of an overvoltage on the cable, to dissipate this overvoltage to earth, and thus to protect other components in the electrical power supply system. A surge arrester such as this contains a stack of varistor blocks, which is held between two connecting elements or end fittings. This arrangement is accommodated in a housing.

In order to ensure that the varistor blocks make good contact with one another even when mechanical loads are applied, it is necessary to hold the stack together under pressure. In the case of surge arresters having a cage design, this is done by means of reinforcing elements, in general rods or cables, preferably glass-fibre-reinforced plastic rods (GFC rods), which are held under tension at the two end fittings.

One problem with surge arresters such as these is to securely attach the reinforcing elements to the end fittings so that the necessary strength is maintained even when mechanical loads are applied, such as those which occur when surge arresters are installed in the open air.

This problem is solved in the cited Japanese patent application by the provision of grooves in the stacking direction of the varistor blocks in the end fittings, into which the reinforcing elements are inserted, with the end of the reinforcing elements being equipped with a thread onto which a nut is screwed, whose diameter is larger than the groove in the end fitting, thus essentially holding the reinforcing element by means of an interlock.

According to a further known technique, as is disclosed in European Patent EP 93 915 343.3, the glass-fibre reinforced plastic rods can also be held on the end fittings by pins or screws, at right angles to the longitudinal direction of the rods.

One problem that arises with the two known techniques is that the projecting corners of the nuts and screws lead to a concentration of the electrical field, and to the risk of partial discharges.

German Patent Application DE 199 40 939 indicates a further possible way to hold the reinforcing elements in the end fittings. For this purpose, a sleeve which tapers conically in the direction of the stack centre of the varistor blocks and has moving side walls is inserted into a conical hole in the end fitting and, acting as a clamping sleeve in a similar manner to a wedge, holds the associated reinforcing element under tension firmly by means of a friction-fitting or force-fitting connection.

This technique makes it possible to avoid projecting edges of screws or nuts, but one remaining problem is that moisture and/or water can enter the interior of the surge arrester through the through-holes in the end fittings, through which the glass-fibre-reinforced rods run and in which the clamping sleeves are inserted, causing permanent damage to the surge arrester.

With this technique, it was therefore necessary either to completely integrate the end fittings in the design of an outer housing, for example by also extrusion coating the end fittings, or it was necessary to take additional measures in order to protect the end fittings against the ingress of moisture on their upper face. These known techniques either have the disadvantage that a large amount of relatively expensive material is required for the outer housing, generally low-viscosity silicone, in order to extrusion coat the entire end fitting, or an additional process step is required in order to fit the additional seal.

The object of the invention is to provide a surge arrester having a cage design, which is not subject to the problem of partial discharges resulting from projecting edges of screws or nuts, and in which problems resulting from the ingress of moisture through through-holes in the end fittings do not occur either.

According to the invention, this problem is solved by a surge arrester according to claim 1 and by a method for production of a surge arrester such as this according to claim 7. The dependent claims relate to further advantageous aspects of the invention.

Preferred embodiments of the surge arrester will be described in the following text with reference to the drawings, in which.

Figure 1:
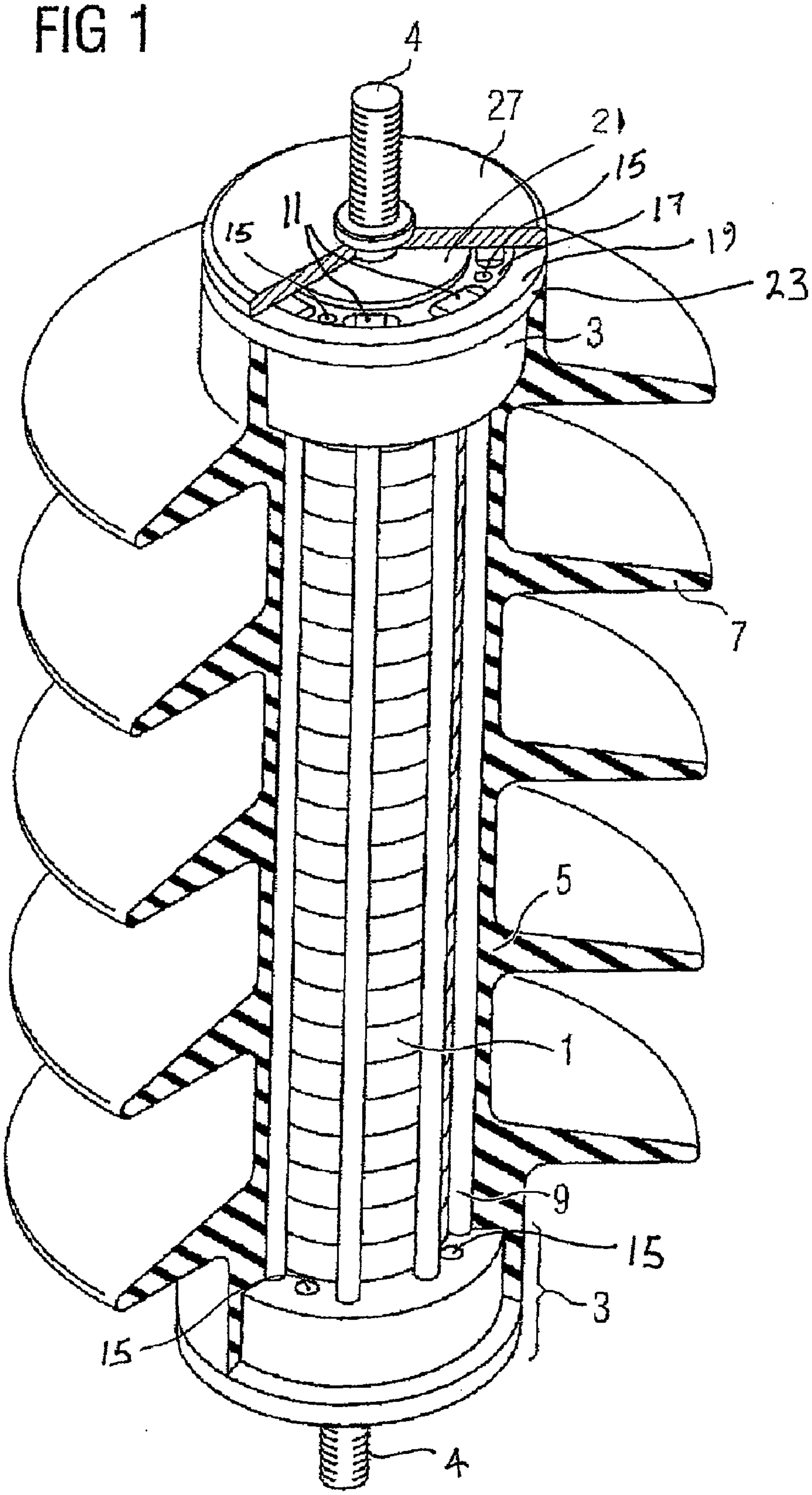
FIG. 1 shows an overall view of a surge arrester with an outer housing partially cut away.

The surge arrester which is shown in FIG. 1 and has a cage design contains at least one varistor block 1. Known ceramic discs with a voltage-dependent resistance (variable resistor) may be used as varistor blocks 1. At low voltages, they operate as virtually perfect isolators, while they have good conductivity at high voltage. Commercially available varistor blocks are produced on the basis of zinc oxide (ZnO). However, the invention is not restricted to zinc-oxide surge arresters such as these, and other metal oxides as well as silicon carbide, for example, may be used for the varistor block. Furthermore, in addition to varistor blocks 1, it is also possible to use further blocks, for example metal blocks or spark-gap blocks in the stack, in order in this way to match the length of the surge arrester to the requirements of the respective purpose.

Commercially-available varistor blocks 1 are in the form of circular cylinders with a diameter of, for example, 5 cm and a height of about 4 cm. Aluminium electrodes, which are not shown in detail, are fitted to both sides of the varistor blocks 1, in order to ensure a better contact. It is also normal to place thin aluminium discs, which are likewise not shown, or spring elements between the varistor blocks 1 in order to further improve the contact.

In addition, a cup spring or the like can be provided in the stack of varistor blocks, in order to ensure that the contact is maintained in the event of temperature fluctuations.

A stack which is formed by stacking varistor blocks 1 such as these and possibly metal blocks on top of one another is held between two end fittings 3 in the surge arrester as shown in FIG. 1. The end fittings 3 are normally formed from aluminium or stainless steel and are designed in such a manner that they can easily be included in existing electrical installations or electrical power supply systems, for example by means of a central screw 4 which projects out of the surge arrester and makes good electrical contact with the varistor blocks 1.

For protection against the environment, these surge arresters are surrounded by an outer housing 5 composed of silicone. The housing is formed by spraying or casting.

Screens 7 are formed on the outside of the housing 5, in order to increase the creepage distance for the current.

Surge arresters are subject to considerable bending moments when they are used in an open-air environment. It is thus necessary to ensure that, even when subjected to relatively large mechanical loads, the contact between the varistor blocks 1 and with the end fittings is maintained, and that edge fracture of the varistor blocks caused by internal tilting of two adjacent varistor blocks is avoided. In order to achieve this, glass-fibre-reinforced plastic rods or cables 9 are normally clamped in between the two end fittings 3, as reinforcing elements. These hold the varistor blocks 1 together between the two end fittings 3, with a tensile load.

In the following text, the anchoring elements are referred to as rods 9, although this should not be seen as any restriction to the invention.

Figure 2:
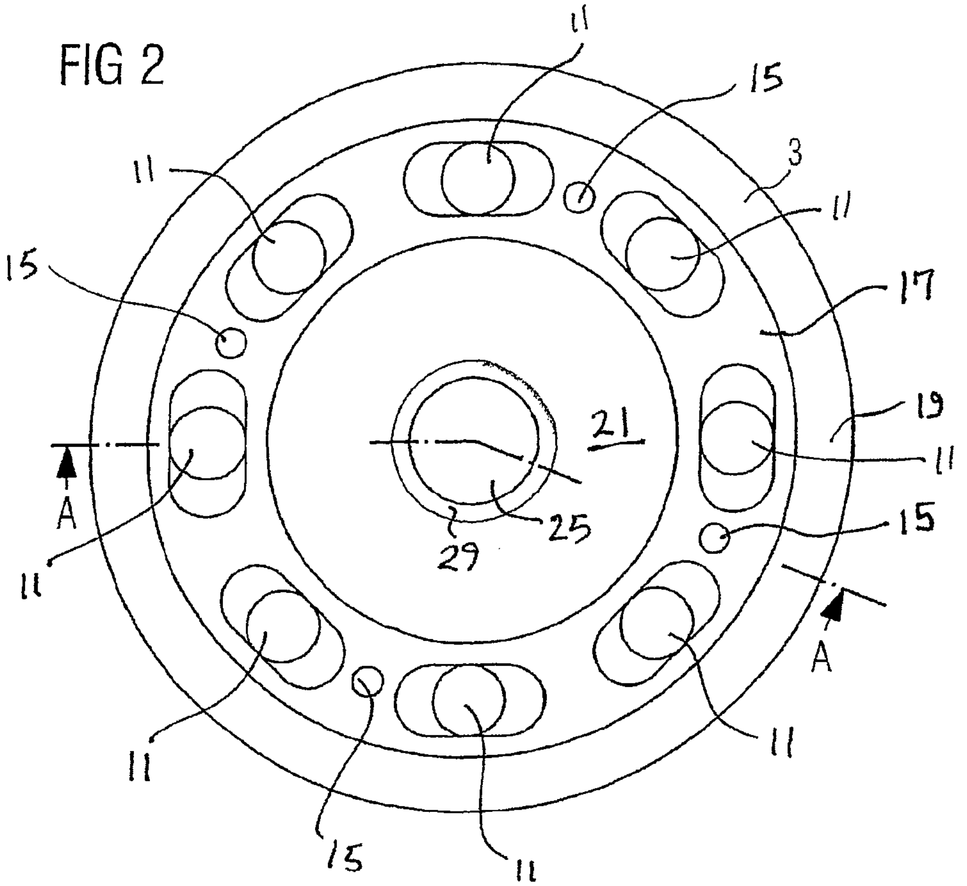
FIG. 2 shows a view of the end fitting of the surge arrester according to the invention.

FIG. 2 shows a plan view of an end fitting for a surge arrester according to the invention. The end fitting 3 is essentially in the form of a circular-cylindrical block, whose diameter is greater than that of the varistor blocks 1. Through-holes 11 which run in the stacking direction are formed along the circumference of the end fittings in the radial area of the end fitting, which projects beyond the varistor blocks. A further through-hole 25 for the central screw 4 is formed, preferably with an internal thread 29, in the centre of the end fitting 3.

In the case of the surge arrester according to the invention, the glass-fibre-reinforced plastic rods 9 are held in holes 11 through the end fittings 3. The glass-fibre-reinforced plastic rods are held firmly in these through-holes 11 by suitable means, such as wedges, wedge sleeves, adhesive bonding, crimp sleeves or the like.

In addition, the end fitting 3 has at least one second through-hole 15. This through-hole 15, in which no reinforcing element is held, is used as a flow connection between the two sides of the end fitting while the outer housing is being formed by spraying or casting.

Furthermore, in the case of the illustrated end fitting, that side of the end fitting 3 which faces away from the stack of varistor blocks 1 is provided with a circumferential groove or channel 17, in which the first and the second through-holes 11 and 15 open. The groove is bounded by a projecting outer rim 19 and an inner rim 21.

In order to prevent moisture from entering the interior of the surge arrester from the outside through the through-holes 11 and/or 15, it is necessary to take measures in order to seal the through-holes 11 and/or 15 against water.

Figure 3:
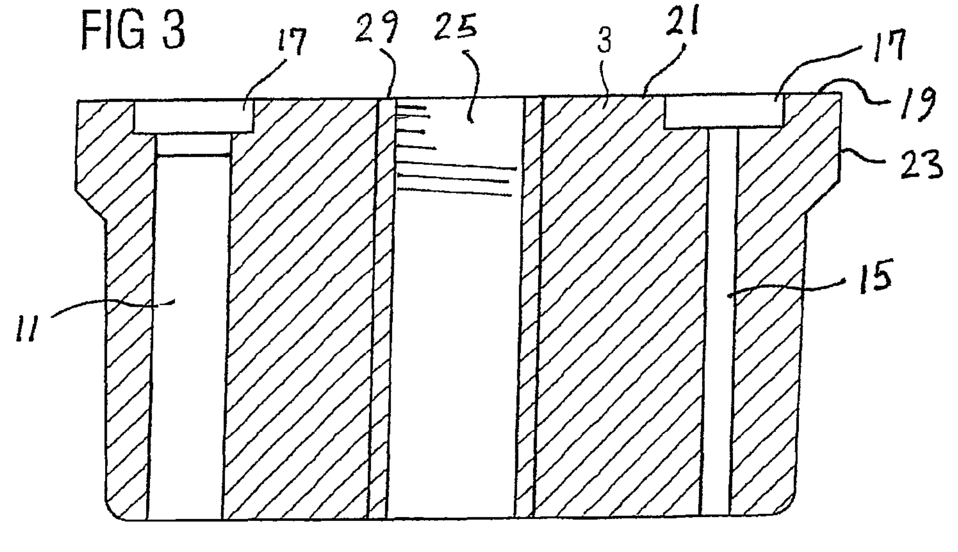
FIG. 3 shows a section view through an end fitting as shown in FIG. 2.

In the case of the surge arrester according to the invention, the cage is first of all formed from two end fittings 3, the varistor blocks 1 and the glass-fibre-reinforced rods 9, firmly connected to the end fittings 3. This cage is then placed in a mould, forming a tight seal at the respective shoulders 23 of the end fittings, as shown in FIG. 3. The mould can be designed such that the screens 7 are also formed at the same time as the outer housing 5, by spraying or casting with silicone.

Low-viscosity silicone as is preferred for this application is relatively expensive. Thus, as can be seen in FIG. 1, the housing 5 is drawn in the area of the varistor blocks 1, that is to say it has a narrower cross section than in the area of the overlap with the end fitting 3.

According to the invention, in addition to the first through-holes 11, in which the glass-fibre-reinforced rods 9 are accommodated, the second through-holes 15 are also formed in the end fittings 3. That end of these holes 11 and 15 which faces the outside of the surge arrester is incorporated in the groove 17, as has been explained. A plurality of second through-holes 15 are preferably provided. It is also possible to provide a plurality of partial segment grooves instead of the continuous circumferential groove 17, which each extend over only a segment of the circumference, and with each first through-hole 11 together with at least one second through-hole 15 opening in one of the partial segment grooves 17.

During the production of the surge arrester, a plate 27 is held by means of a central screw 4 in the central hole 25 with the internal thread 29 of the end fitting 3. The plate 27 shown in FIG. 1 lays flat on the rim 19 at the end fitting 3, forming a seal, with a cavity remaining in the area of the groove 17. If required, individual vent holes can be provided in the plate.

During the casting of the outer housing 5, one or more inlet openings for the low-viscosity silicone are normally provided in the area of the screens 7, and corresponding ventilation holes are provided, likewise in the area of the screens 7. The silicone penetrates into the mould, forms the outer housing 5 with the screens 7, in the process running through the through-holes 15 and the grooves 17, and further into the through-holes 11 with the glass-fibre-reinforced rods. This results in the through-holes 11 being hermetically sealed from the outside with the glass-fibre-reinforced plastic rods 9, and being protected against moisture, in one process, with the formation of the outer housing.

As can be seen in FIG. 2, a second through-hole 15 can preferably be provided for two first through-holes 11. This is not absolutely necessary and it is possible to provide a second through-hole 15 for each first through-hole 11, or a single second through-hole 15 can be provided for all of the first through-holes 11.

The internal diameter of the second through-holes 15 can be chosen in such a manner that the low-viscosity silicone can flow through them during the casting process.

FIG. 3 shows a section through an end fitting along the line A-A in FIG. 2. As can be seen, the second through-holes 15 have a considerably smaller cross section than the first through-holes 11.

Although the invention has been described with reference to one preferred embodiment, the invention is not restricted to this embodiment, and those skilled in the art will identify various variations and modifications within the scope of protection of the attached claims.

The invention claimed is:

1. A surge arrester having:

at least one varistor block;

two end fittings which are arranged on opposite sides of the varistor block;

at least one reinforcing element, which holds the varistor block and the end fittings together and runs through a first hole through at least one of the end fittings;

an outer housing composed of silicone which is formed by casting or spraying around the varistor block, the reinforcing element and parts of the end fittings; and a second through-hole formed in the at least one end fitting and open in a groove on that side of the end fitting which faces away from the varistor block, with the groove extending from the second through-hole to the first through-hole, and with the second through-hole, the groove and the first through-hole being sealed with silicone on that side of the end fitting which faces away from the varistor block.

2. The surge arrester according to claim 1, wherein the varistor block or blocks is or are formed from a metal oxide, preferably zinc oxide.

3. The surge arrester according to claim 1, wherein the end fittings are formed from metal, preferably aluminium.

4. The surge arrester according to claim 1, wherein the housing (5) of the surge arrester is equipped with screens (7).

5. The surge arrester according to claim 1, wherein the reinforcing element is a glass-fibre-reinforced plastic rod or cable, which holds the end fitting and the varistor block together with a tensile load.

6. The surge arrester according to claim 5, wherein an anchoring element in the form of a wedge or a wedge sleeve holds the glass-fibre-reinforced plastic rod in the through-hole.

7. A method for production of a surge arrester according to claim 1, having the following steps:

mounting at least one reinforcing element in a first through-hole in a first end fitting;

arrangement a stack of varistor blocks on the end fitting and alongside the reinforcing element;

fitting a second end fitting on the stack of varistor blocks and the reinforcing elements in such a manner that the varistor blocks are located between the two end fittings;

mounting the reinforcing element in a first through-hole in the second end fitting; and extrusion-coating or encapsulation of parts of the two end fittings, of the varistor blocks, and of the reinforcing element in order to form an outer housing composed of plastic, with the plastic flowing through the second through-holes and the groove into the end fittings, and with the first through-holes being sealed on that side of the end fittings which faces away from the varistor blocks.

* * * * *